(12) United States Patent
Lo et al.

(10) Patent No.: US 9,081,553 B2
(45) Date of Patent: Jul. 14, 2015

(54) POWER SUPPLY

(75) Inventors: Cheng-Yi Lo, Taoyuan Hsien (TW);
De-Chang Jin, Taoyuan Hsien (TW);
Yi-Han Su, Taoyuan Hsien (TW)

(73) Assignee: DELTA ELECTRONICS, INC., Taoyuan (TW)

(*) Notice: Subject to any disclaimer, the term of this patent is extended or adjusted under 35 U.S.C. 154(b) by 650 days.

(21) Appl. No.: 13/425,432

(22) Filed: Mar. 21, 2012

(65) Prior Publication Data

US 2012/0242297 A1 Sep. 27, 2012

(30) Foreign Application Priority Data

Mar. 25, 2011 (TW) .............................. 100110257 A

(51) Int. Cl.
H02J 1/00 (2006.01)
H02J 3/00 (2006.01)
G05F 1/70 (2006.01)
G06F 1/18 (2006.01)
G06F 1/20 (2006.01)
G06F 1/26 (2006.01)

(52) U.S. Cl.
CPC ................ G06F 1/189 (2013.01); G06F 1/206 (2013.01); G06F 1/26 (2013.01)

(58) Field of Classification Search
None
See application file for complete search history.

(56) References Cited

U.S. PATENT DOCUMENTS

| | | | | |
|---|---|---|---|---|
| 6,129,598 | A * | 10/2000 | Yu et al. | 439/883 |
| 7,907,416 | B2 | 3/2011 | He et al. | |
| 2003/0184934 | A1 * | 10/2003 | Bushue et al. | 361/62 |
| 2007/0138971 | A1 * | 6/2007 | Chen | 315/209 R |
| 2009/0289801 | A1 * | 11/2009 | Lo et al. | 340/584 |

FOREIGN PATENT DOCUMENTS

| | | |
|---|---|---|
| CN | 101644940 A | 2/2010 |
| TW | M265701 | 5/2005 |
| TW | M337772 | 8/2008 |
| TW | 200951696 A | 12/2009 |
| TW | M394508 U | 12/2010 |

* cited by examiner

Primary Examiner — Jared Fureman
Assistant Examiner — Aqeel Bukhari
(74) Attorney, Agent, or Firm — CKC & Partners Co., Ltd.

(57) ABSTRACT

A power supply includes an integrated cable manager board. The integrated cable manager board is configured to integrate elements of the power supply on the integrated cable manager board. The integrated cable manager board includes a circuit monitoring device and a plurality of connectors. The circuit monitoring device is disposed on the integrated cable manager board and monitors the circuit status of the power supply. The connectors are disposed on the integrated cable manager board and each of the connectors is operable to provide power.

10 Claims, 2 Drawing Sheets

POWER SUPPLY

RELATED APPLICATIONS

This application claims priority to Taiwan Application Serial Number 100110257, filed Mar. 25, 2011, which is herein incorporated by reference.

BACKGROUND

1. Technical Field

The embodiment of the present disclosure relates generally to an electricity transformation device and, more particularly, to a power supply.

2. Description of Related Art

Recent years, demands for more convenient, robust and economical goods continue to rise with the advancement and progress of industry and social-economic. As such, products with more economic values are being developed to meet these and other needs.

A conventional power supply is to dispose each circuit component on the motherboard. In order to conduct the output power source of each circuit component, some processes are needed such as a perforation process, a patch cord process, and so on, and the wires of multiple groups of output wires need to be managed.

As mentioned above, multiple groups of output wires are disposed in the case of the power supply so that the inner space of the power supply is crowded. The processes of perforation and patch cord on the motherboard are more difficult. In addition, the circuit component layout is difficult due to there being a lot of monitoring devices disposed on the motherboard, and the electrical property and stability of the power supply is affected by a plurality of signals of the monitors.

In view of the above, the existing apparatus still has obvious inconvenience and defects and needs further improvement. In order to solve the above problems, those skilled in the art are trying hard to find a solution, but no applicable method is put forward.

Therefore, it's a problem of how to improve the production difficulty and the space being crowded due to performing some processes to the motherboard such as a perforation process, a patch cord process, and so on, and managing the wires of multiple groups of output wires. In addition, it's also a problem of how to decrease the circuit component layout difficulty and weakness of the electrical property and electrical stability of the power supply due to there being a lot of monitoring devices. Accordingly, there exists an urgent need in the related art to provide a solution to address this disadvantage.

SUMMARY

A power supply is provided so as to improve the production difficulty and the space being crowded due to performing some processes to the motherboard such as a perforation process, a patch cord process, and so on, and the wires of multiple groups of output wires need to be managed. Furthermore, the power supply is provided to decrease the circuit component layout difficulty and weakness of the electrical property and electrical stability of the power supply due to there being a lot of monitoring devices.

Thus, one aspect of the embodiment of the present disclosure is to provide a power supply. The power supply comprises an integrated cable manager board. The integrated cable manager board is operable to integrate the wires of the components of the power supply on the integrated cable manager board.

In addition, the integrated cable manager board comprises a circuit monitoring device and a plurality of connectors. The circuit monitoring device is disposed on the integrated cable manager board for monitoring the circuit status of the power supply. The connectors are disposed on the integrated cable manager board wherein each of the connectors is operable to provide power.

In one embodiment of the present disclosure, the integrated cable manager board further comprises a fan rotation speed monitoring device and a power source voltage regulator. The fan rotation speed monitoring device is disposed on the integrated cable manager board for monitoring a fan rotation speed. The power source voltage regulator is disposed on the integrated cable manager board to perform a voltage regulation process to a direct-current power source.

In another embodiment of the present disclosure, the circuit monitoring device is an over voltage protection device, an under voltage protection device, an over current protection device, a short circuit protection device or an over temperature protection device.

In yet another embodiment of the present disclosure, the power supply further comprises a power factor correction circuit, a direct-current to direct-current power source converter, and a buck converter. The power factor correction circuit is operable to perform a power factor correction process to a direct-current power source. The direct-current to direct-current power source converter is electrically connected to the power factor correction circuit for performing a direct-current to direct-current power source conversion process to the direct-current power source. The buck converter is electrically connected to the direct-current to direct-current power source converter for performing a buck conversion process to the direct-current power source processed by the direct-current conversion process and providing the direct-current power source processed by the buck conversion process to the integrated cable manager board.

Thus, another aspect of the embodiment of the present disclosure is to provide a power supply. The power supply comprises an integrated cable manager board. The integrated cable manager board is operable to integrate a wire of each component of the power supply on the integrated cable manager board.

In addition, the integrated cable manager board comprises a fan rotation speed monitoring device and a plurality of connectors. The fan rotation speed monitoring device is disposed on the integrated cable manager board for monitoring a fan rotation speed. The connectors are disposed on the integrated cable manager board for providing power.

In one embodiment of the present disclosure, the integrated cable manager board further comprises a circuit monitoring. The circuit monitoring device is disposed on the integrated cable manager board for monitoring the circuit status of the power supply.

In yet another embodiment of the present disclosure, the circuit monitoring device is an over voltage protection device, an under voltage protection device, an over current protection device, a short circuit protection device, or an over temperature protection device.

In another embodiment of the present disclosure, the integrated cable manager board further comprises a power source voltage regulator. The power source voltage regulator is disposed on the integrated cable manager board to perform a voltage regulation process to a direct-current power source.

In still another embodiment of the present disclosure, the power supply further comprises a power factor correction circuit, a direct-current to direct-current power source converter, and a buck converter. The power factor correction circuit is operable to perform a power factor correction process to a direct-current power source. The direct-current to direct-current power source converter is electrically connected to the power factor correction circuit for performing a direct-current to direct-current power source conversion process to the direct-current power source. The buck converter is electrically connected to the direct-current to direct-current power source converter for performing a buck conversion process to the direct-current power source processed by the direct-current conversion process and providing the direct-current power source processed by the buck conversion process to the integrated cable manager board.

Thus, yet another aspect of the embodiment of the present disclosure is to provide a power supply. The power supply comprises an integrated cable manager board. The integrated cable manager board is operable to integrate a wire of each component of the power supply on the integrated cable manager board.

In addition, the integrated cable manager board comprises a power source voltage regulator and a plurality of connectors. The power source voltage regulator is disposed on the integrated cable manager board to perform a voltage regulation process to a direct-current power source. The connectors are disposed on the integrated cable manager board wherein each of the connectors is operable to provide power.

In one embodiment of the present disclosure, the integrated cable manager board further comprises a circuit monitoring device. The circuit monitoring device is disposed on the integrated cable manager board for monitoring the circuit status of the power supply.

In another embodiment of the present disclosure, the circuit monitoring device is an over voltage protection device, an under voltage protection device, an over current protection device, a short circuit protection device, or an over temperature protection device.

In yet another embodiment of the present disclosure, the power supply further comprises a power factor correction circuit, a direct-current to direct-current power source converter, and a buck converter. The power factor correction circuit is operable to perform a power factor correction process to a direct-current power source. The, direct-current to direct-current power source converter is electrically connected to the power factor correction circuit for performing a direct-current to direct-current power source conversion process to the direct-current power source. The buck converter is electrically connected to the direct-current to direct-current power source converter for performing a buck conversion process to the direct-current power source processed by the direct-current conversion process and providing the direct-current power source processed by the buck conversion process to the integrated cable manager board.

In summary, the embodiments of the present disclosure provide the power supply. The power supply is operable to improve the production difficulty and the space being crowded due to performing some processes to the motherboard such as a perforation process, a patch cord process, and so on, and the wires of multiple groups of output wires need to be managed. Furthermore, the power supply is provided to decrease the circuit component layout difficulty and weakness of the electrical property and electrical stability of the power supply due to there being a lot of monitoring devices.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
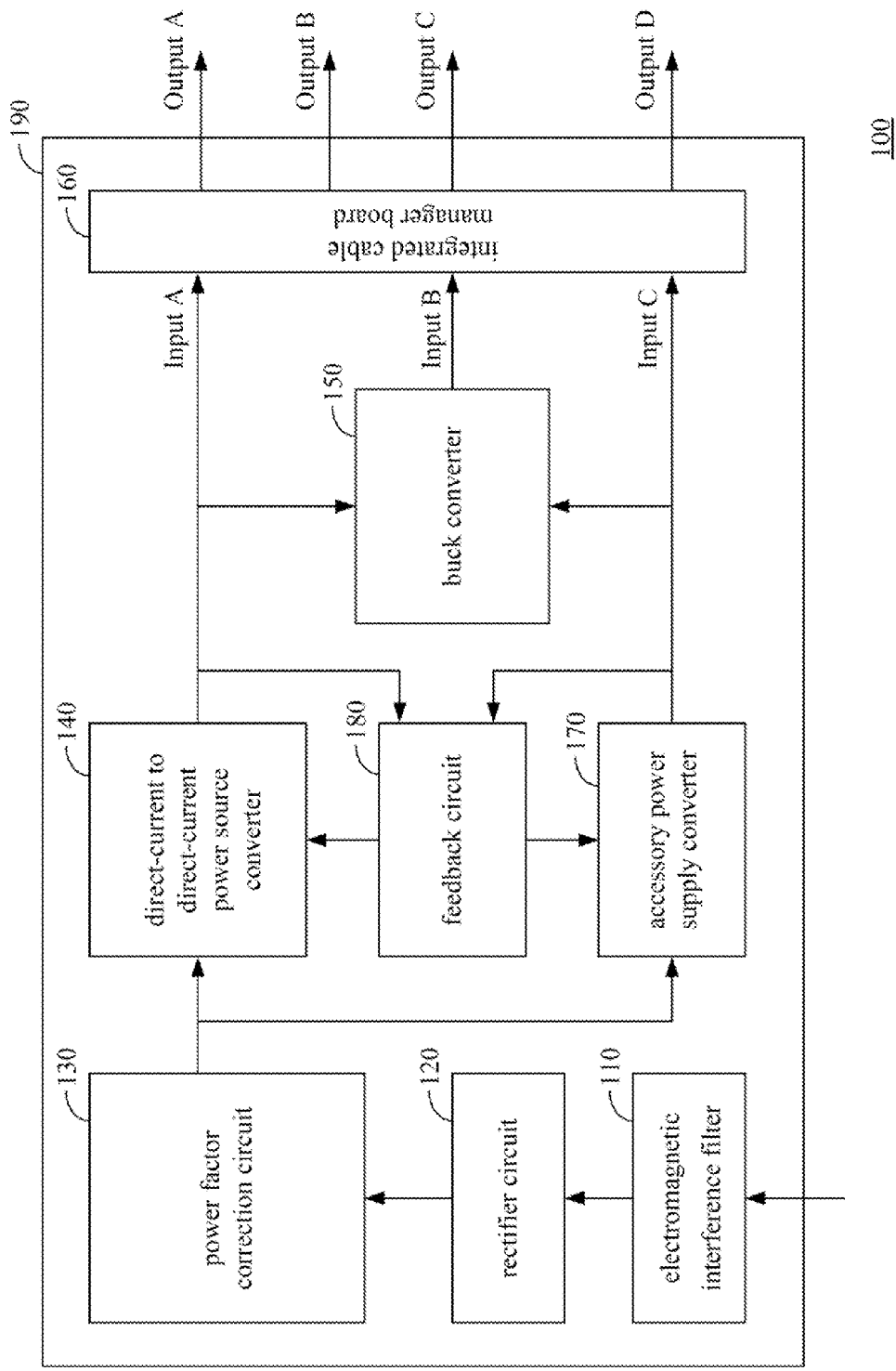
FIG. 1 schematically shows a circuit block diagram of a power supply according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

Figure 2:
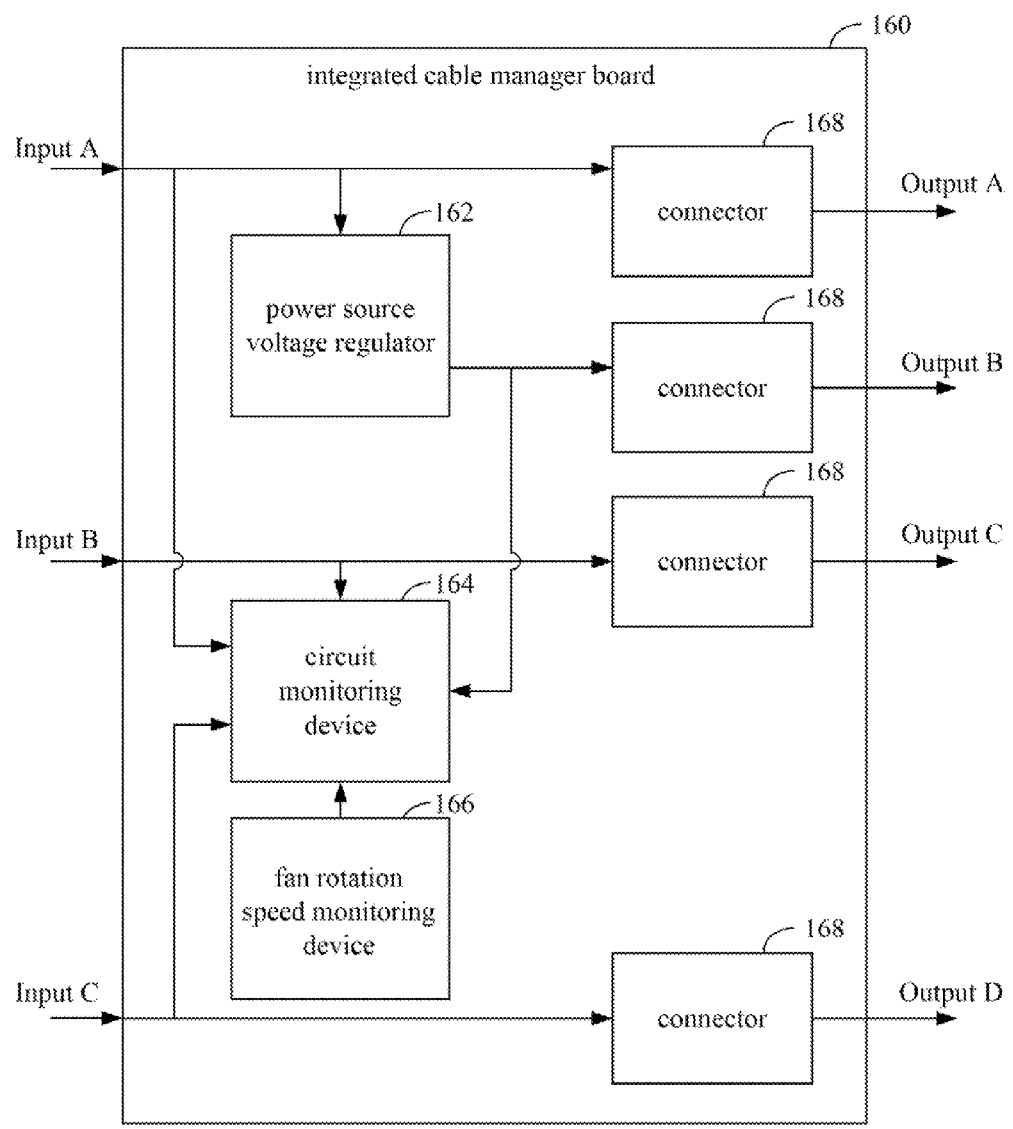
FIG. 2 schematically shows a circuit block diagram of an integrated cable manager board of FIG. 1 of one embodiment of the present disclosure.

FIG. 1 schematically shows a circuit block diagram of a power supply 100 according to one embodiment of the present disclosure, and FIG. 2 schematically shows a circuit block diagram of an integrated cable manager board 160 according to FIG. 1 of one embodiment of the present disclosure.

Reference is now made to both FIG. 1 and FIG. 2, the power supply 100 comprises an integrated cable manager board 160. The integrated cable manager board 160 is operable to integrate the wires of the components of the power supply 100 on the integrated cable manager board 160.

In manufacturing, the integrated cable manager board 160 may comprise a power source voltage regulator 162, a circuit monitoring device 164, a fan rotation speed monitoring device 166 and a plurality of connectors 168. The power source voltage regulator 162 is disposed on the integrated cable manager board 160 to perform a voltage regulation process to a direct-current power source wherein the power source voltage regulator 162 is operable to provide −12V voltage for computer devices such as a horn, a network device, and so on.

In addition, the circuit monitoring device 164 is disposed on the integrated cable manager board 160 for monitoring the circuit status of the power supply 100. The fan rotation speed monitoring device 166 is disposed on the integrated cable manager board 160 for monitoring a fan rotation speed.

According to the principle and the spirit of the present disclosure, the power source voltage regulator 162, the circuit monitoring device 164 and the fan rotation speed monitoring device 166 may be selectively disposed on the integrated cable manager board 160 according to actually need.

For example, the power source voltage regulator 162 may be disposed on the integrated cable manager board 160 according to actually need, and the circuit monitoring device 164 and the fan rotation speed monitoring device 166 are disposed in power supply 100 and outside of the integrated cable manager board 160. Moreover, the circuit monitoring device 164 may be disposed in the integrated cable manager board 160, and the power source voltage regulator 162 and the fan rotation speed monitoring device 166 are disposed in the power supply 100 and outside of the integrated cable manager board 160. In addition, the fan rotation speed monitoring device 166 may be disposed on the integrated cable manager board 160, and the power source voltage regulator 162 and the circuit monitoring device 164 are disposed in the power supply 100 and outside of the integrated cable manager board 160.

Furthermore, the power source voltage regulator 162 and the circuit monitoring device 164 may be disposed on the integrated cable manager board 160, and the fan rotation speed monitoring device 166 is disposed in the power supply 100 and outside of the integrated cable manager board 160. Moreover, the circuit monitoring device 164 and the fan rotation speed monitoring device 166 may be disposed on the integrated cable manager board 160, and the power source voltage regulator 162 is disposed in the power supply 100 and outside of the integrated cable manager board 160. In addition, the power source voltage regulator 162 and the fan rotation speed monitoring device 166 may be disposed on the integrated cable manager board 160, and the circuit monitoring device 164 is disposed in the power supply 100 and outside of the integrated cable manager board 160.

It is noteworthy that the power supply 100 comprises a motherboard 190. In the prior art, each circuit component is disposed on the motherboard 190, which results in the space being crowded in the power supply 100. Comparing with the prior art, the embodiment of the present disclosure further comprises the integrated cable manager board 160 disposed independently from the motherboard 190. The power source voltage regulator 162, the circuit monitoring device 164 or the fan rotation speed monitoring device 166 can be selectively disposed on the integrated cable manager board 160 according to actual need. Comparing to the prior art, there is an extra area of the motherboard 190 of the embodiment of the present disclosure for the circuit component to dispose thereon and for the wire to layout thereon.

In view of the foregoing, the embodiment of the present disclosure can decrease circuit component layout difficulty and weakness of the electrical property and electrical stability of the power supply 100 due to there being more circuit components (for example, monitor device) on the motherboard 190 of the power supply 100 and outside of the integrated cable manager board 160. Comparing to the prior art, there is an additional area on the motherboard 190 and outside of the integrated cable manager board 160 for the circuit component to dispose thereon and for the wire to layout thereon, so that the wire layout is better and the noise signal can be reduced. Comparing to the prior art, the electrical property and stability of the power supply 100 of the embodiment of the present disclosure can be increased about 0.5%.

Furthermore, the integrated cable manager board 160 is operable to integrate the wire of each component of the power supply 100 on the integrated cable manager board 160, so there is no need to perform some processes to the motherboard 190 such as a perforation process, a patch cord process and so on, and there is no need to manage the wires of multiple groups of output wires. As a result, the manufacturing process of the power supply 100 of the embodiment of the present disclosure can be simplified, so that the manufacturing time can be decreased and the cost can be reduced. In addition, the embodiment of the present disclosure can increase the manufacturing efficiency due to there being no need to manage the wires of multiple groups of output wires.

In one embodiment of the present disclosure, the circuit monitoring device 164 may be an over voltage protection device, an under voltage protection device, an over current protection device, a short circuit protection device or an over temperature protection device.

Reference is now made to FIG. 1, the power supply 100 can further comprise an electromagnetic interference filter 110 and a rectifier circuit 120.

The electromagnetic interference filter 110 is operable to filter the electromagnetic interference signal generated by an outer power source. The rectifier circuit 120 is electrically connected to the electromagnetic interference filter 110 and operable to transduce the alternative-current power source into the direct-current power source.

In another embodiment of the present disclosure, the power supply 100 further comprises a power factor correction circuit 130, a direct-current to direct-current power source converter 140 and a buck converter 150.

In operation, the power factor correction circuit 130 is electrically connected to the rectifier circuit 120 and performs a power factor correction process to the direct-current power source to provide a 380V direct-current power source. The direct-current to direct-current power source converter 140 is electrically connected to the power factor correction circuit 130 and performs a direct-current to direct-current power source conversion process to the direct-current power source. Specifically, the direct-current to direct-current power source converter 140 is the main converter of the power supply 100 sand can transduce a 380V power source into a 12V to 48V direct-current power source.

In addition, the buck converter 150 is electrically connected to the direct-current to direct-current power source converter 140 and performs a buck conversion process to the direct-current power source processed by the direct-current conversion process, and provides the direct-current power source processed by the buck conversion process to the integrated cable manager board 160. Specifically, the buck converter 150 is operable to transduce the 12V to 48V direct-current power source provided by the direct-current to direct-current power source converter 140 into a 3.3V to 24V voltage. For example, the buck converter 150 can transduce the 12V to 48V direct-current power source into the 3.3V, 5V, 12V, −12V and so on to fit the need of all sorts of computer systems.

In an optional embodiment of the present disclosure, the power supply 100 further comprises an accessory power supply converter 170 and a feedback circuit 180. The accessory power supply converter 170 is electrically connected to the power factor correction circuit 130 and is operable to keep providing a direct-current power source when the power supply 100 is in a standby condition, that is to say, when the direct-current to direct-current power source converter 140 stops providing the direct-current power source. The feedback circuit 180 is operable to provide a feedback signal to the direct-current to direct-current power source converter 140 and the accessory power supply converter 170.

In view of the foregoing embodiments of the present disclosure, many advantages of the present disclosure are now apparent. The embodiment of the present disclosure provides a power supply 100 to decrease circuit component layout difficulty and weakness of the electrical property and electrical stability of the power supply due to there being more circuit components on the motherboard 190 of the power supply 100 and outside of the integrated cable manager board 160. Comparing to the prior art, there is an additional area of the motherboard 190 of the embodiment of the present disclosure for the circuit component to dispose thereon and for the wire to layout thereon, so that the wire layout is better and the noise signal can be reduced. Comparing to the prior art, the electrical property and stability of the power supply 100 of the embodiment of the present disclosure can be increased about 0.5%.

Furthermore, the integrated cable manager board 160 is operable to integrate the wire of each component of the power supply 100 on the integrated cable manager board 160, so there is no need to perform some processes to the motherboard 190 such as a perforation process, a patch cord process and so on, and there is no need to manage the wires of multiple groups of output wires. As a result, the manufacturing process of the power supply 100 of the embodiment of the present disclosure can be simplified, so that the manufacturing time can be decreased and the cost can be reduced. In addition, the embodiment of the present disclosure can increase the manufacturing efficiency due to there being no need to manage the wires of multiple groups of output wires.

It will be understood that the above description of embodiments is given by way of example only and that various modifications may be made by those with ordinary skill in the art. The above specification, examples and data provide a complete description of the structure and use of exemplary embodiments of the disclosure. Although various embodiments of the disclosure have been described above with a certain degree of particularity, or with reference to one or more individual embodiments, those with ordinary skill in the art could make numerous alterations to the disclosed embodiments without departing from the spirit or scope of this disclosure, and the scope thereof is determined by the claims that follow.

What is claimed is:

1. A power supply, comprising:
   an integrated cable manager board for integrating a wire of each component of the power supply on the integrated cable manager board, the integrated cable manager board comprising:
      a circuit monitoring device disposed on the integrated cable manager board for monitoring the circuit status of the power supply; and
      a plurality of connectors disposed on the integrated cable manager board wherein each of the connectors is operable to provide power,
   wherein the power supply further comprises:
      a power factor correction circuit for performing a power factor correction process to a direct-current power source;
      a direct-current to direct-current power source converter electrically connected to the power factor correction circuit for performing a direct-current to direct-current power source conversion process to the direct-current power source; and
      a buck converter electrically connected to the direct-current to direct-current power source converter for performing a buck conversion process to the direct-current power source processed by the direct-current conversion process and providing the direct-current power source processed by the buck conversion process to the integrated cable manager board.

2. The power supply according to claim 1, wherein the integrated cable manager board further comprises:
   a fan rotation speed monitoring device disposed on the integrated cable manager board for monitoring a fan rotation speed; and
   a power source voltage regulator disposed on the integrated cable manager board to perform a voltage regulation process to a direct-current power source.

3. The power supply according to claim 1, wherein the circuit monitoring device is an over voltage protection device, an under voltage protection device, an over current protection device, a short circuit protection device or an over temperature protection device.

4. A power supply, comprising:
   an integrated cable manager board for integrating a wire of each component of the power supply on the integrated cable manager board, the integrated cable manager board comprising:
      a fan rotation speed monitoring device disposed on the integrated cable manager board for monitoring a fan rotation speed; and
      a plurality of connectors disposed on the integrated cable manager board for providing power,
   wherein the power supply further comprises:
      a power factor correction circuit for performing a power factor correction process to a direct-current power source;
      a direct-current to direct-current power source converter electrically connected to the power factor correction circuit for performing a direct-current to direct-current power source conversion process to the direct-current power source; and
      a buck converter electrically connected to the direct-current to direct-current power source converter for performing a buck conversion process to the direct-current power source processed by the direct-current conversion process and providing the direct-current power source processed by the buck conversion process to the integrated cable manager board.

5. The power supply according to claim 4, wherein the integrated cable manager board further comprises:
   a circuit monitoring device disposed on the integrated cable manager board for monitoring the circuit status of the power supply.

6. The power supply according to claim 5, wherein the circuit monitoring device is an over voltage protection device, an under voltage protection device, an over current protection device, a short circuit protection device or an over temperature protection device.

7. The power supply according to claim 4, wherein the integrated cable manager board further comprises:
   a power source voltage regulator disposed on the integrated cable manager board to perform a voltage regulation process to a direct-current power source.

8. A power supply, comprising:
   an integrated cable manager board for integrating a wire of each component of the power supply on the integrated cable manager board, the integrated cable manager board comprising:
      a power source voltage regulator disposed on the integrated cable manager board to perform a voltage regulation process to a direct-current power source; and
      a plurality of connectors disposed on the integrated cable manager board for providing power,
   wherein the power supply further comprises:
   a power factor correction circuit for performing a power factor correction process to a direct-current power source:
   a direct-current to direct-current power source converter electrically connected to the power factor correction circuit for performing a direct-current to direct-current power source conversion process to the direct-current power source; and
   a buck converter electrically connected to the direct-current to direct-current power source converter for performing a buck conversion process to the direct-current power source processed by the direct-current conversion process and providing the direct-current power source processed by the buck conversion process to the integrated cable manager board.

9. The power supply according to claim 8, wherein the integrated cable manager board further comprises:
   a circuit monitoring device disposed on the integrated cable manager board for monitoring the circuit status of the power supply.

10. The power supply according to claim 9, wherein the circuit monitoring device is an over voltage protection device, an under voltage protection device, an over current protection device, a short circuit protection device, or an over temperature protection device.

\* \* \* \* \*